(12) United States Patent
Guevel et al.

(10) Patent No.: US 9,140,813 B2
(45) Date of Patent: Sep. 22, 2015

(54) METHOD AND FOLDABLE SUPPORT ASSEMBLY

(75) Inventors: Christophe Guevel, Massy (FR); Junya Konno, Massy (FR)

(73) Assignee: CGGVERITAS SERVICES SA, Massy Cedex (FR)

( * ) Notice: Subject to any disclaimer, the term of this patent is extended or adjusted under 35 U.S.C. 154(b) by 721 days.

(21) Appl. No.: 13/477,177

(22) Filed: May 22, 2012

(65) Prior Publication Data
US 2012/0300591 A1 Nov. 29, 2012

(30) Foreign Application Priority Data

May 26, 2011 (FR) ...................................... 11 54612

(51) Int. Cl.
*G01V 1/38* (2006.01)
(52) U.S. Cl.
CPC ............ *G01V 1/3817* (2013.01); *G01V 1/3843* (2013.01)
(58) Field of Classification Search
CPC ............................ G01V 1/3817; G01V 1/3843
USPC .......................................................... 367/16
See application file for complete search history.

(56) References Cited

U.S. PATENT DOCUMENTS

| | | | |
|---|---|---|---|
| 3,019,412 A | 1/1962 | Crawford | |
| 4,970,046 A | 11/1990 | Dolengowski | |
| 7,411,863 B2 * | 8/2008 | Toennessen | ..................... 367/20 |
| 8,854,922 B2 * | 10/2014 | Vahida et al. | ................. 367/144 |
| 2009/0147626 A1 * | 6/2009 | Vahida et al. | ................. 367/173 |
| 2011/0149679 A1 * | 6/2011 | Baker et al. | ....................... 367/3 |

FOREIGN PATENT DOCUMENTS

| | | |
|---|---|---|
| GB | 1206580 | 9/1970 |
| GB | 2454802 A | 5/2009 |
| GB | 2460865 A | 12/2009 |

OTHER PUBLICATIONS

French Search Report issued in FR Application No. 1154612 mailed Jan. 19, 2012.

* cited by examiner

*Primary Examiner* — Mark Hellner
(74) *Attorney, Agent, or Firm* — Patent Portfolio Builders PLLC

(57) ABSTRACT

Method and support assembly configured to change from a stowing position to an operational position. The support assembly includes a head module; an actuator attached to the head module; a tail module; plural modules provided between the head module and the tail module to form a first branch and a second branch, each branch being connected between the head module and the tail module; and a cable system provided through the means for guiding of the plural modules and connected to the actuator for being wind up and unwind to change a distribution of the modules from an operational position to a stowed position.

20 Claims, 13 Drawing Sheets

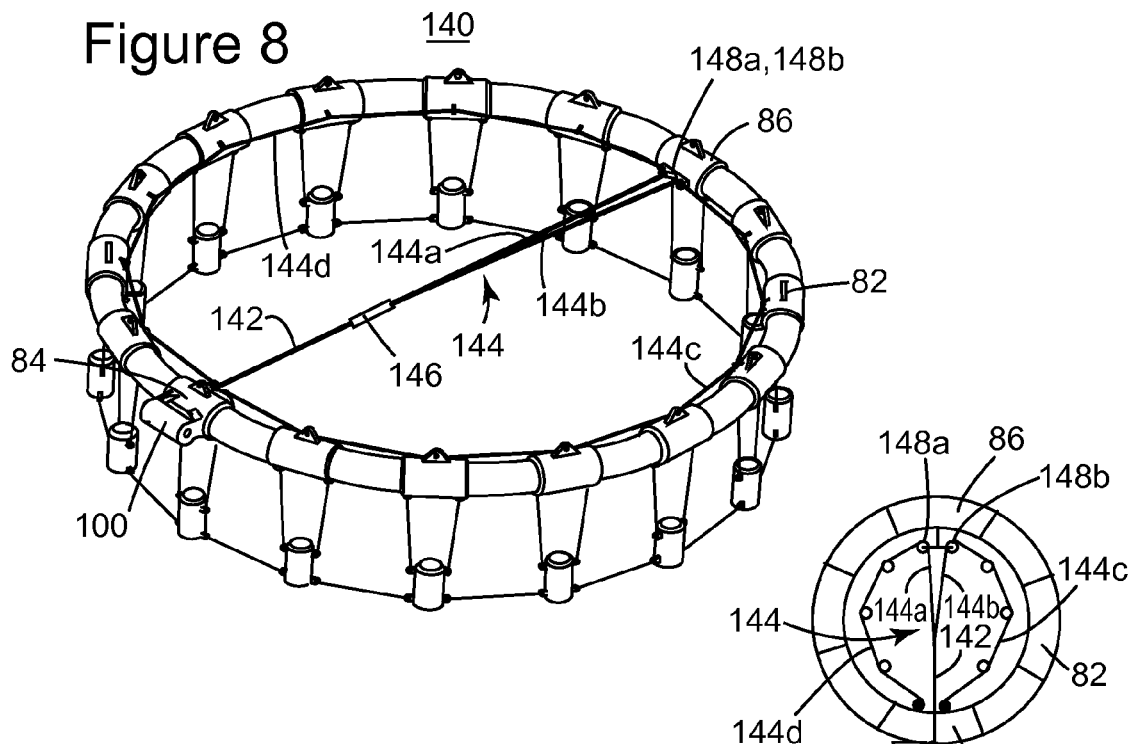
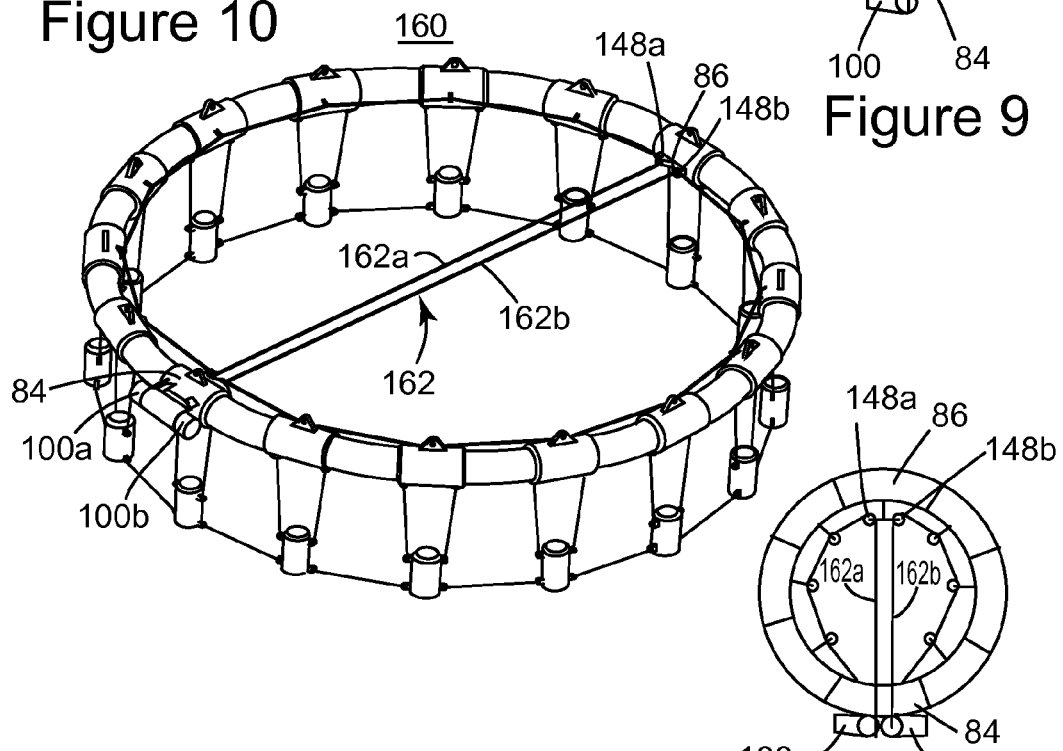
Figure 8
Figure 9
Figure 10
Figure 11

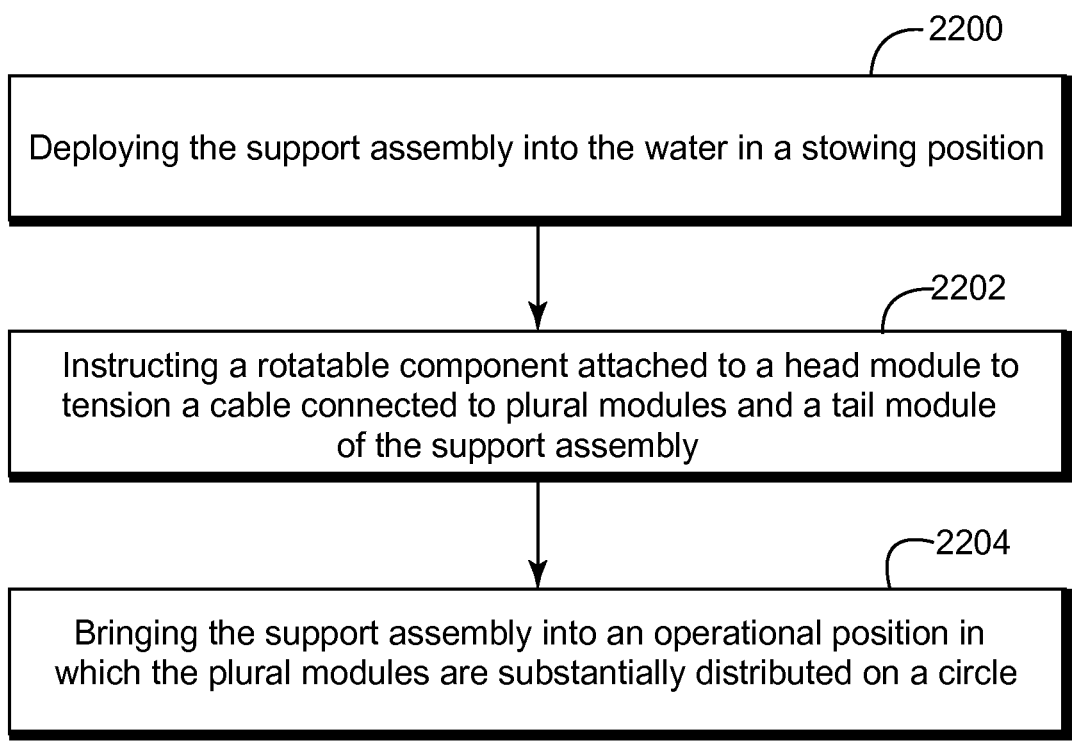

METHOD AND FOLDABLE SUPPORT ASSEMBLY

BACKGROUND

1. Technical Field

Embodiments of the subject matter disclosed herein generally relate to methods and systems and, more particularly, to mechanisms and techniques for providing a foldable support assembly for a seismic source.

2. Discussion of the Background

During the past years, the interest in developing new oil and gas production fields has dramatically increased. However, the availability of land-based production fields is limited. Thus, the industry has now extended drilling to offshore locations, which appear to hold a vast amount of fossil fuel. Offshore drilling is an expensive process. Thus, those engaged in such a costly undertaking invest substantially in geophysical surveys in order to more accurately decide where to drill in order to avoid a dry well.

Marine seismic data acquisition and processing generate a profile (image) of the geophysical structure (subsurface) under the seafloor. This profile is used by those trained in the field, to evaluate the presence or absence of oil and/or gas traps. Thus, providing a high resolution image of the subsurface is an ongoing process for the exploration of natural resources, including, among others, oil and/or gas.

During a seismic gathering process, as shown in FIG. 1, a vessel 10 drags an array of seismic detectors provided on streamers 12. The streamers may be disposed horizontally, i.e., lying at a constant depth relative to a surface 14 of the ocean. The vessel 10 also drags a sound source assembly 16 that is configured to generate an acoustic wave 18. The acoustic wave 18 propagates downwards toward the seafloor 20 and penetrates the seafloor until eventually a reflecting structure 22 (reflector) reflects the acoustic wave. The reflected acoustic wave 24 propagates upwardly until is detected by a detector on streamer 12.

An example of a sound source assembly 16 is illustrated in FIG. 2. The sound source assembly 16 includes a float 30 that is configured to float at the surface of the water. Plural sound sources 32 are suspended from the float by cables 34 having a predetermined length. Additional cables 36 may be used to connect the plural sources 32 to each other to minimize changes in the positions of the individual sources. The plural sources 32 may be an air gun or other known devices used in the art for generating sound waves.

For creating an accurate image of the subfloor of the ocean, not only the detectors but also the sound source should comply with various requirements. For example, the positions of the plural sound sources 32 are desirable to be unchanged relative to each other after each sound generation. In addition, it was observed that having more air guns produce a more powerful source. However, for generating a desired sound wave, the plural sound sources need to be distributed along various geometrical shapes. Thus, the size of the deployed sound sources may be larger than the size of the vessel's back deck capacity, which is a challenge for storing the sound sources on the vessel and deploying the sound sources from the vessel.

Accordingly, it would be desirable to provide systems and methods that avoid the afore-described problems and drawbacks.

SUMMARY

According to one exemplary embodiment, there is a water submerged support assembly for supporting a seismic source assembly. The support assembly includes a head module; an actuator attached to the head module; a tail module; plural modules provided between the head module and the tail module, the plural modules having means for guiding a cable, wherein part of the plural modules are connected to each other to form a first branch and the remainder of the plural modules are connected to each other to form a second branch, each branch being connected between the head module and the tail module; and a cable system provided through the means for guiding of the plural modules and connected to the actuator for being wind up and unwind to change a distribution of the modules from an operational position to a stowed position. The operational position is defined by the modules being distributed substantially in a round shape, and the stowed position is defined by the first branch and the second branch being substantially parallel to each other.

According to another exemplary embodiment, there is a water submerged support assembly for supporting a seismic source assembly. The water submerged support assembly includes a head module; an actuator attached to the head module; a tail module; plural modules provided between the head module and the tail module to form a first branch and a second branch, each branch being connected between the head module and the tail module; and a cable system provided through the means for guiding of the plural modules and connected to the actuator for being wind up and unwind to change a distribution of the modules from an operational position to a stowed position.

According to still another exemplary embodiment, there is a method for deploying a support assembly from a towing vessel into water or for retracting the support assembly from water into the towing vessel. The method includes deploying the support assembly into the water in a stowing position; instructing an actuator attached to a head module to tension a cable connected to plural modules and a tail module of the support assembly; and bringing the support assembly into an operational position in which the plural modules are substantially distributed on a circle, wherein the plural modules have means for guiding the cable, part of the plural modules are connected to each other to form a first branch and the remainder of the plural modules are connected to each other to form a second branch, each branch being connected to the head module and the tail module.

BRIEF DESCRIPTION OF THE DRAWINGS

The accompanying drawings, which are incorporated in and constitute a part of the specification, illustrate one or more embodiments and, together with the description, explain these embodiments. It is noted that no dimensions should be inferred from the drawings unless specifically indicated in the specification. In the drawings:

FIG. 8 is a schematic diagram of a support assembly having an actuator according to an exemplary embodiment;

FIG. 9 is a schematic diagram of a cable system of a support assembly according to an exemplary embodiment;

FIG. 10 is a schematic diagram of a support assembly having multiple actuators according to an exemplary embodiment;

FIG. 11 is a schematic diagram of a cable system of a support assembly according to an exemplary embodiment;

FIG. 22 is a flow chart illustrating a method for deploying a support assembly according to an exemplary embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a sound source assembly that includes plural individual sound sources. However, the embodiments to be discussed next are not limited to these structures, but may be applied to other structures that are capable to provide seismic waves.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a foldable support assembly that is configured to support plural seismic sources. The support assembly includes plural modules connected to each other. The support assembly is configured to have an operational position and a stowed position. The operational position achieves a substantially circular distribution of modules of the support assembly. Cables and actuators may be used to unfold the support assembly from the stowed position to the operational position as discussed next. Such an actuator may be, for example, a winch.

Figure 1:
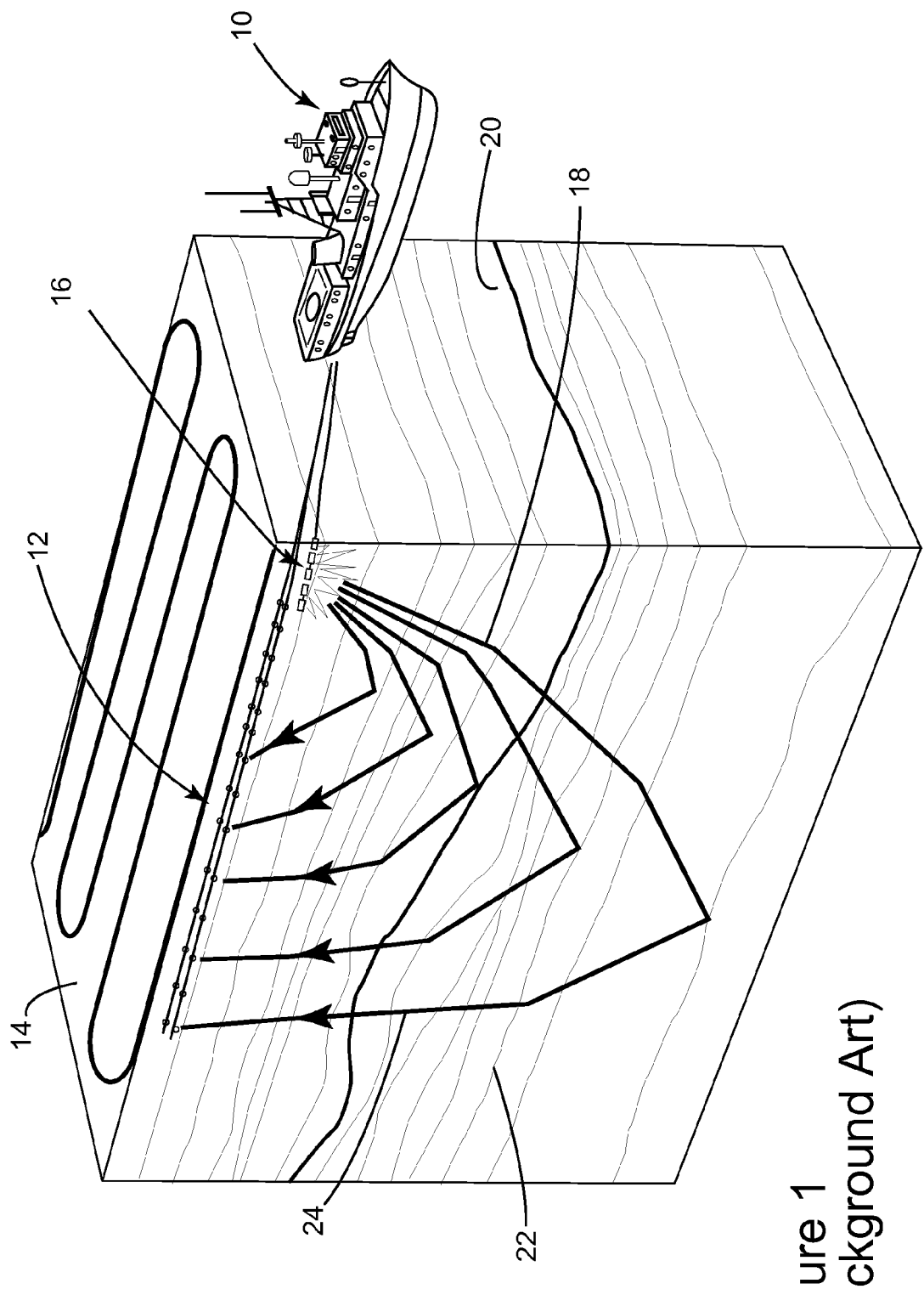
FIG. 1 is a schematic diagram of a conventional seismic data acquisition configuration.
Figure 2:
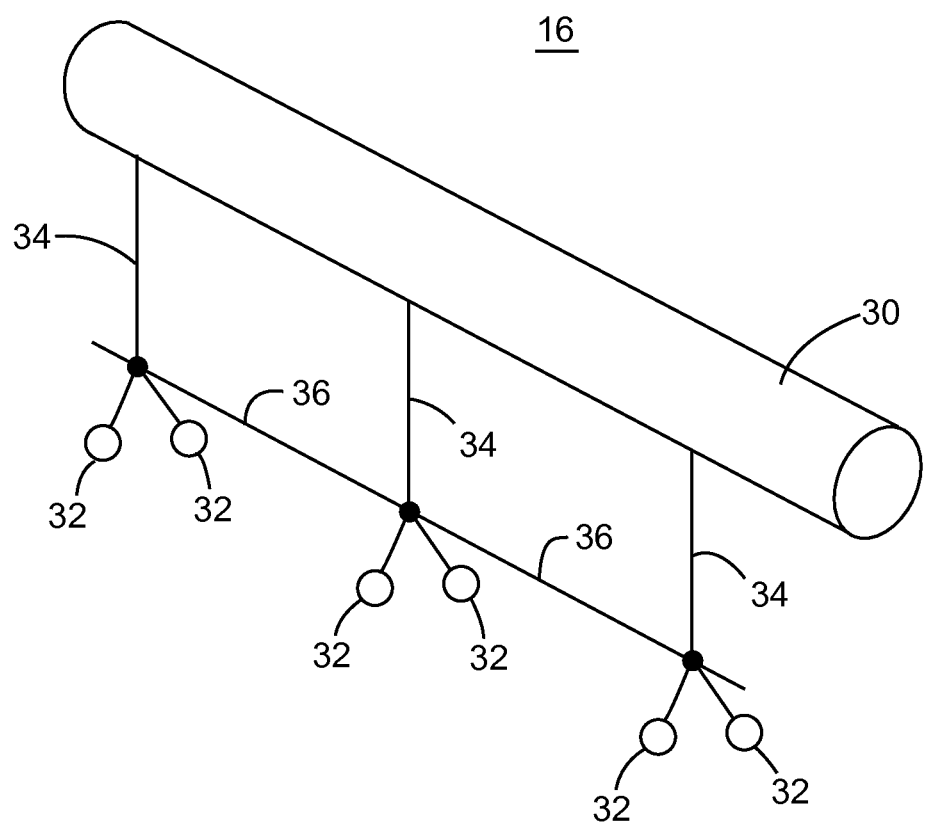
FIG. 2 is a schematic diagram of plural seismic sources attached to a float.
Figure 3:
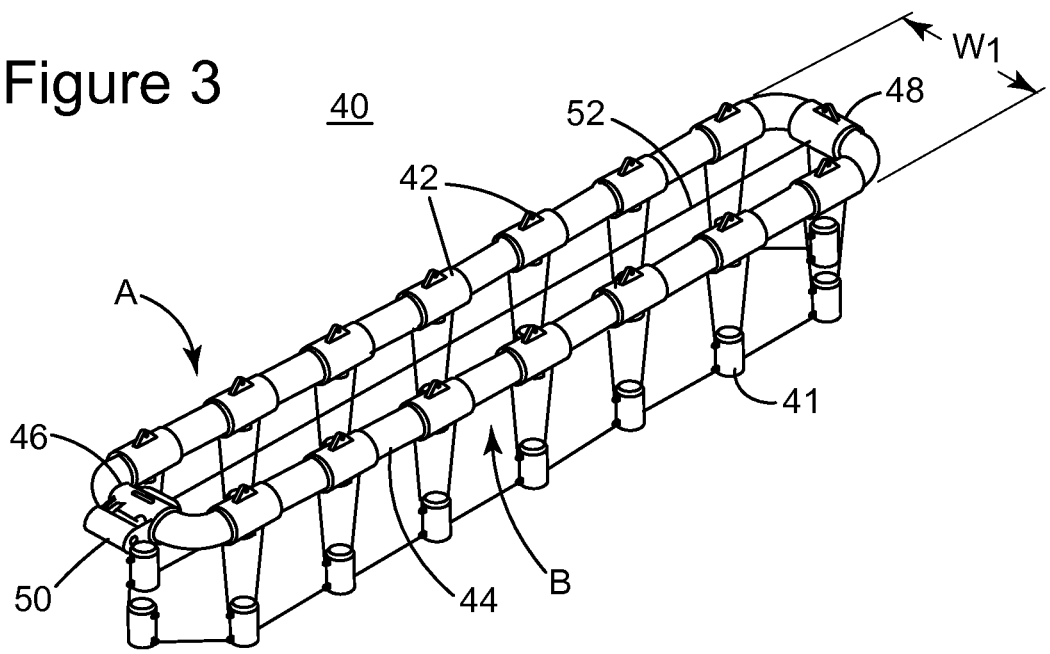
FIG. 3 is a schematic diagram of a support assembly in a stowed position according to an exemplary embodiment.

According to an exemplary embodiment illustrated in FIG. 3, a support assembly 40 and a set of seismic sources 41 is shown in a stowed position. It is noted that in the stowed (folded) position, a width w1 of the support assembly 40 is smaller than a width w2 of the support assembly 40 in the operational position illustrated in FIG. 5. Thus, the support assembly 40 in the folded position has one or more of the following advantages: it fits through an opening (that usually has a size smaller than w2) of the vessel that tows the support assembly, makes it easier to stow plural source assemblies and/or spare parts on the vessel deck, etc. The support assembly 40 may not fit through the opening in the vessel when in the operational position illustrated in FIG. 5. Thus, the support assembly is used in the stowed position when deployed or retracted to the vessel.

The support assembly 40 includes individual elements 42 (modules) separated by connectors 44. The connectors 44 may be flexible as discussed later. The modules 42 include a head module 46 and a tail module 48. The remaining modules are distributed along two branches A and B, between the head module 46 and the tail module 48 as shown in FIG. 3. The two branches A and B are substantially parallel in the folded position. The head module 46 may include an actuator 50 (e.g., winch) for actuating a cable system 51. The cable system 51 includes a cable 52 that is fixedly connected to the tail module 48 and to a spool of the actuator 50. By actuating cable 52, the foldable configuration of the support assembly may be changed as shown in FIG. 4.

Figure 4:
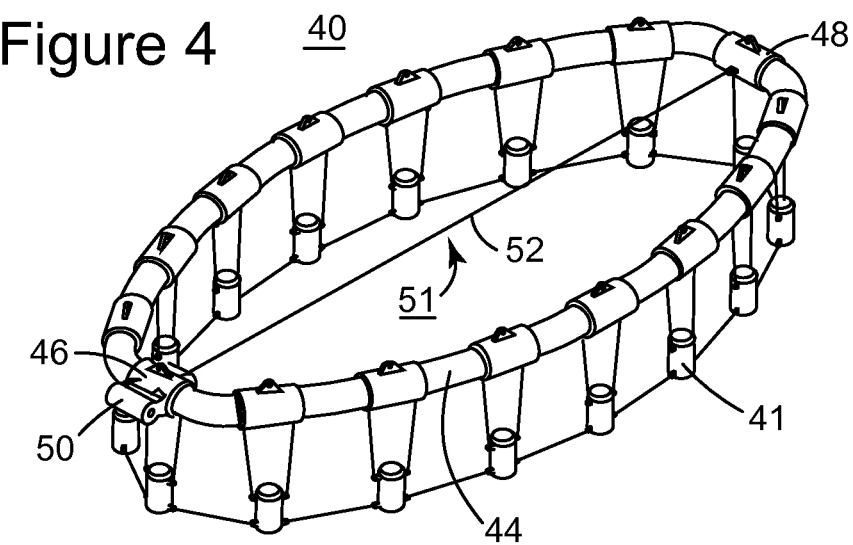
FIG. 4 is a schematic diagram of a support assembly in an operational position according to an exemplary embodiment.

FIG. 4 shows the support assembly 40 having a partially unfolded configuration. However, the support assembly is not fully unfolded, which is the case of FIG. 5. The support assembly 40 is operational even in the position shown in FIG. 4, i.e., between the folded position of FIG. 3 and the fully unfolded position of FIG. 5.

In one exemplary embodiment the modules 42 cannot float by themselves. Thus, a floating system (shown later) may need to be attached to the support assembly for providing the support assembly at a desired depth relative to the surface of the water. However, the modules 42 may be made to float or be lifted by fairs (wings) when towed. The modules 42 may be made of any material and in any shape as long as they are strong enough to support a load (e.g., a seismic source as will be discussed later) and to resist the air-guns explosions, underwater and vessel environments, etc. Each module 42 may be mechanically connected to adjacent modules 42. In one application, a module 42 has joints for connecting to the other modules. The joints may include any known joints in the art.

Figure 5:
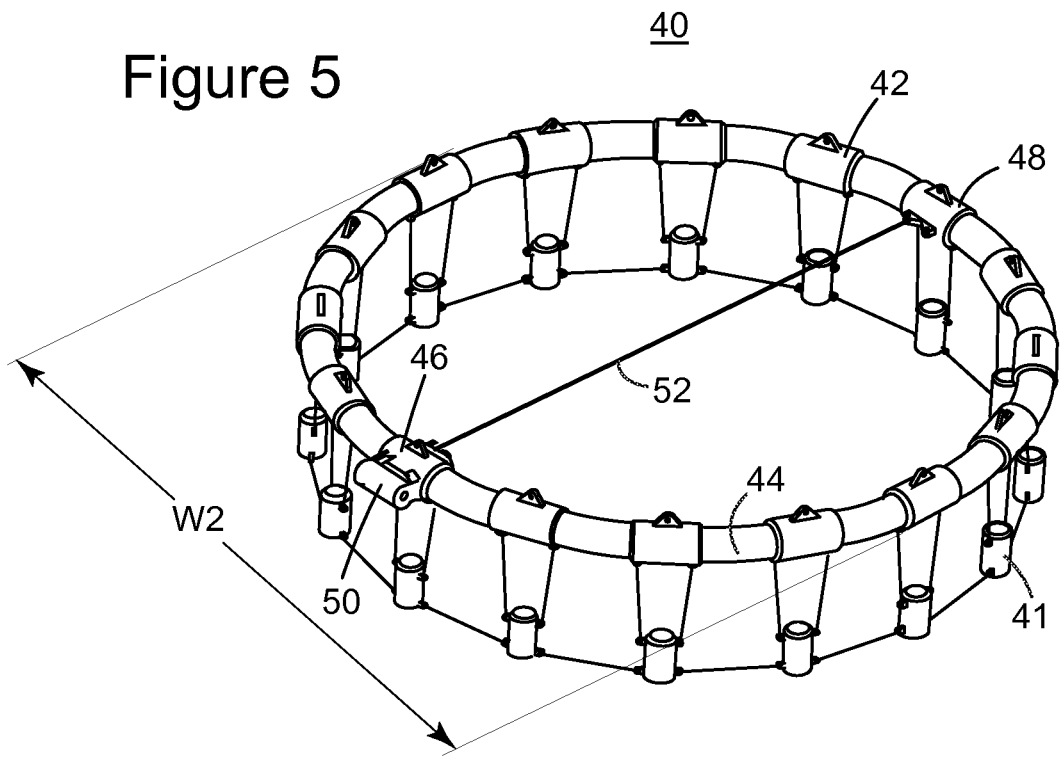
FIG. 5 is a top view of a support assembly in a fully unfolded position according to an exemplary embodiment.

FIG. 5 is a top view of the support assembly 40 when fully unfolded. This figure shows that the cable 52 extends only between the tail module 48 and the head module 46. In one application, the modules are attached to floats that are floating at the surface of the water and are capable of supporting the support assembly 40 at a desired depth below the surface of the water.

The modular design of the support assembly 40 permits an easy replacement of any module when maintenance or other considerations determine the need to change the module. Also, modules may be added or taken away from the support assembly 40 as required by data acquisition and processing needs.

In order to change the shape of the support assembly 40, from the stowed position of FIG. 3 to the operational position of FIGS. 4 and 5, the actuator 50 may be remotely controlled (from the vessel) via a wire. In one application, the change of shape from the folded position of FIG. 3 to the fully unfolded position of FIG. 5 or any intermediary position of FIG. 4 may be performed manually, from the vessel. In another application, when the support assembly 40 is released from the vessel into the water and a spool of the actuator 50 is allowed to freely rotate, the initial position of the support assembly 40 is as shown in FIG. 3. After the actuator is instructed to retract, the spool (not shown) winds the cable 52 until the support assembly 40 arrives in the operational position shown in FIG. 5 or any intermediary position as shown in FIG. 4.

The desired shape of the support assembly may be, in an exemplary embodiment, a circle as shown in FIG. 5. Those skilled in the art would understand that due to the size and weight of the various components of the support assembly, a perfect circle is unlikely to be achieved. Thus, variations of the support assembly from the ideal circle are considered to be covered by the expression "substantially circle". Other shapes may be achieved with this design. For example, the support assembly may take a shape substantially similar to an ellipse as shown in FIG. 4 or other shapes, one being the same as the stowed configuration. For further clarity, when the shape of the support assembly is considered to be substantially a circle, it is understood that a center of each module 42 is considered to be distributed on the circle. However, if one or more of the centers of the modules 42 are not on the circle, but for example, up to 20% off the circle in terms of a radius of the circle, the shape of the support assembly is still considered to be a circle.

Figure 6:
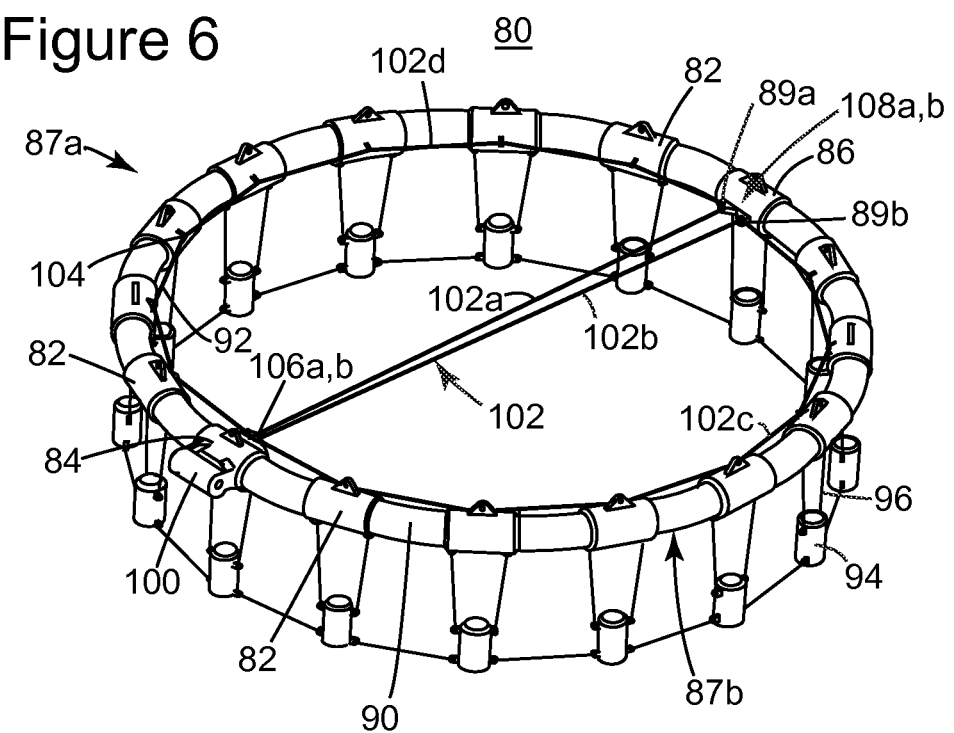
FIG. 6 is a schematic diagram of a support assembly in an operational position and having an actuator according to an exemplary embodiment.

According to an exemplary embodiment illustrated in FIG. 6, a support assembly 80 includes plural modules 82. A head module 84 is connected to two adjacent modules 82. Opposite to the head module 84 there is a tail module 86. The single tail module 86 may have two rings (or pulleys or other means) 89a and 89b for receiving corresponding cables 102a and 102b, as discussed later. In one application, part of the modules 82 are connected to each other to form a first branch 87a (e.g., spine shaped) and the other part of the modules 82 are connected to each other to form a second branch 87b (e.g., spine shaped). The two branches 87a and 87b are connected between the head module 84 and the tail module 86. Flexible connectors 90 are provided between the modules 82. The connector 90 is made of an elastic material that allows limited deformation if a force is applied to the modules 82. Modules 82 may be made of metal. FIG. 6 also shows that modules 82 and connectors 90 are in contact with each other. There may be no connector 90 between the head module 84 and the modules 82 and between the tail module 86 and the modules 82. In one application, connectors having a different shape may be provided between the head module 84 and modules 82.

FIG. 6 also shows how a plurality of seismic sources 94 are suspended by, e.g., chains 96, from corresponding modules 82. The embodiment illustrated in FIG. 6 is capable of circularly or otherwise distributing the seismic sources 94 when in use and folding the seismic sources 94 as shown in FIG. 3 for the deploying and retraction phases. FIG. 6 shows a cable system 102. The cable system 102 may include a single cable having plural sections 102a, 102b, 102c, and 102d. The head module 84 has an actuator (e.g., a winch) 100 connected to an end of the section 102d. Cable stoppers 92 (shown in more details later) are provided along the cable sections 102c and 102d and they are used to control a position of one module 82 relative to a next module 82 such that a desired shape of the entire support assembly is achieved, e.g., a circle, ellipse, etc.

Figure 7:
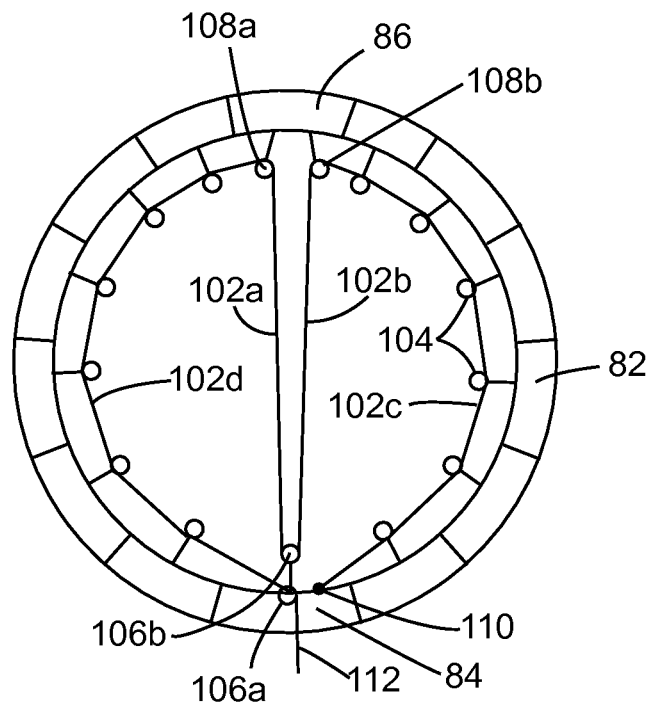
FIG. 7 is a schematic diagram of a cable system of a support assembly according to an exemplary embodiment.

Various pulleys 106a and 106b may be provided at the head module 84 and other pulleys 108a and 108b may be provided at the tail module 86 for achieving the various configurations of the support assembly 80 as shown in FIG. 7. FIG. 7 shows the configuration of these pulleys in more details. Each module 82 may have a pulley or cable support 104 (means for supporting) for supporting cables of the cable system 102. The tail module 86 may have two pulleys 108a and 108b. A different number of pulleys may be used. Cable section 102c has an end 110 fixedly attached to the head module 84 while cable section 102d has an end 112 attached to the spool (not shown) of the actuator 100. Cable sections 102a and 102b extend between the pulleys 108a, 108b and pulley 106b. By actuating the end 112 of the cable section 102d and by having the end 110 of the cable section 102c fixed, the tail module 86 is brought closer to the head module 84.

With this arrangement, one of the possible operational positions is defined by the modules 82 being distributed substantially in a circular shape as shown in FIG. 6 and the stowed position is defined by the first branch 87a and the second branch 87b being substantially parallel to each other.

An alternative embodiment is illustrated in FIG. 8. A support assembly 140 includes substantially the same modules as the embodiment of FIG. 6. However, a cable system 144 is different. The cable system 144 includes a cable 142 connected to a spool of the actuator 100 and to a cable divider 146. The cable divider 146 is connected to cable sections 144a and 144b, which are also part of the cable system 144. After passing pulleys 148a and 148b of the tail module 86, as shown in FIG. 9, ends of cable sections 148c and 148d are fixedly attached to head module 84. Cable sections are part of the cable system 144.

FIG. 10 shows another embodiment in which another cable system is used. The support assembly 160 includes a cable system 162 having two cables 162a and 162b. An end of each cable 162a and 162b is fixedly attached to the head module 84 while the other end of each cable is attached to a corresponding actuator 100a and 100b as shown in FIG. 11.

Figure 12:
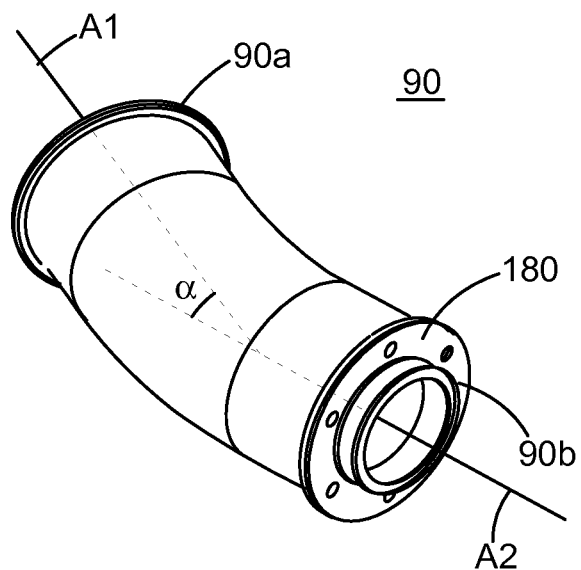
FIG. 12 is a schematic diagram of a connector according to an exemplary embodiment.

FIG. 12 shows a detailed image of a connector 90. As shown in this figure, the connector 90 may be curved and this curvature may be described by an angle α between a longitudinal axis A1 and a longitudinal axis A2. In one embodiment, the connector 90 is straight and may be bent as shown in FIG. 12 when the actuator actuates the cable system. Axis A1 is central and perpendicular to a first end 90a of the connector 90 and axis A2 is central and perpendicular to a second end 90b of the connector 90. The angle α varies depending on the number of modules, their size, and the desired shape to be achieved by the support assembly. The connector 90 may be made, in an exemplary embodiment, of a material that is capable to elastically deform, such as rubber or polyurethane (PUR) or other similar materials. In one application, the connector 90 is straight and becomes deformed as shown in FIG. 12 when the support assembly is in the operational position. Thus, depending on the final desired shape of the operational position of the support assembly 80, different shaped connectors 90 may be used. For the exemplary embodiment illustrated in FIG. 6, all the connectors 90 may be made to have the same shape. However, if a different shape is desired, for example, an ellipse, then the connectors 90 may have different shapes and/or sizes for a same support assembly. Further, the connector 90 may have flanges 180 for connecting to corresponding flanges of the modules 82.

Figure 13:
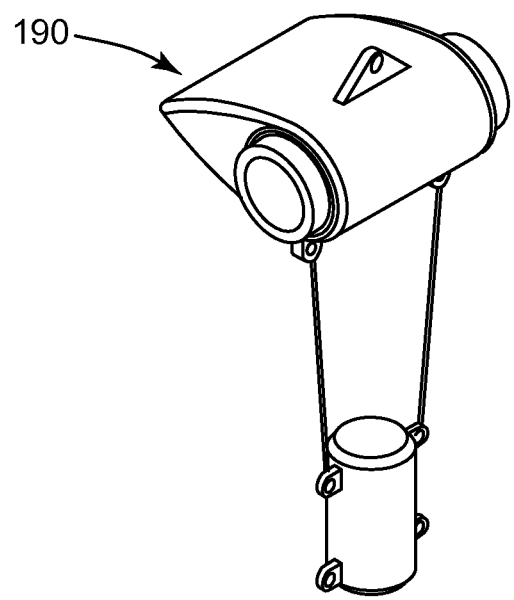
FIG. 13 is a schematic diagram of a module with a wing or fairing according to an exemplary embodiment.

In an exemplary embodiment illustrated in FIG. 13, more or less modules 82 may be provided with a corresponding wing 190 that makes the towing of the support assembly 80 more controllable and reduce a friction between the water and the modules 82. The wing 190 may also produce a lift force for the module 82 to which is attached.

Figure 14:
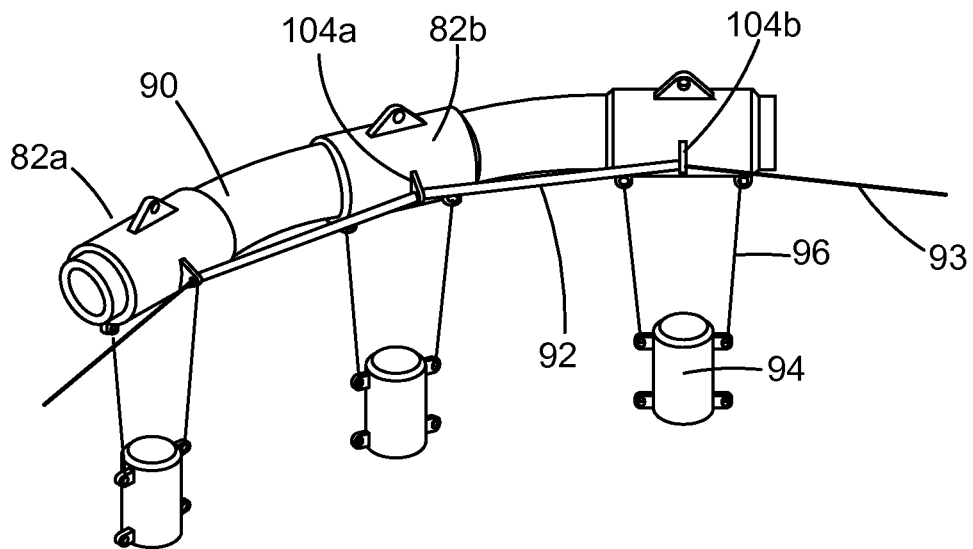
FIG. 14 is schematic diagram of a cable stopper according to an exemplary embodiment.
Figures 15A, 15B:
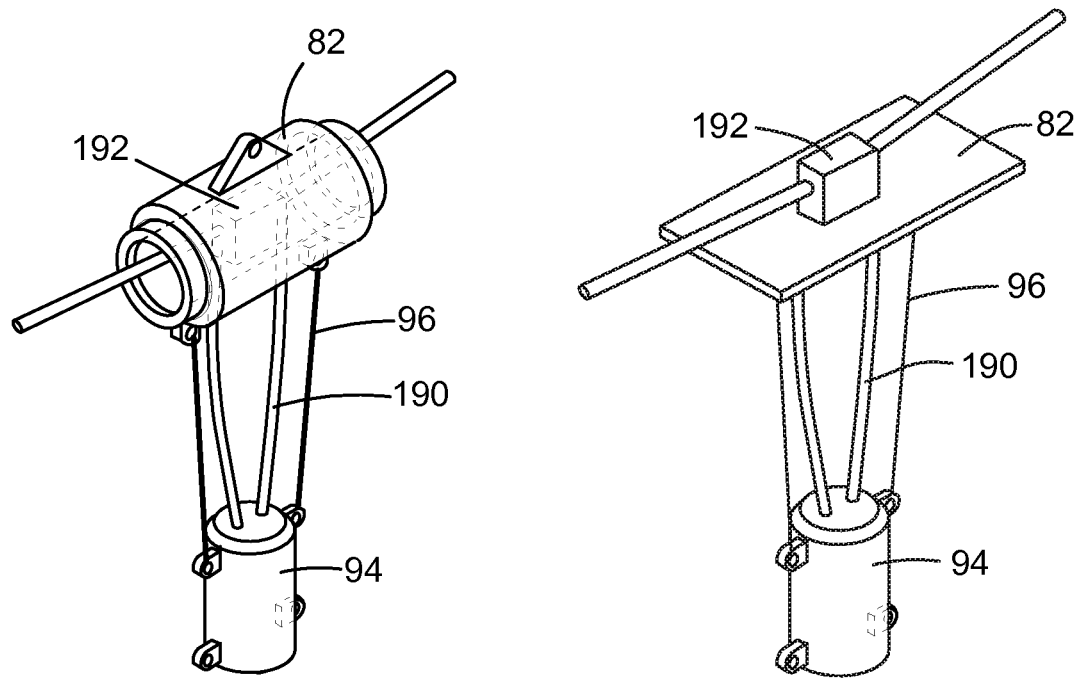
FIGS. 15a and b are schematic diagrams of an electrical connection between a module and a seismic source according to an exemplary embodiment.

In an exemplary embodiment illustrated in FIG. 14, a module 82b is shown sandwiched between two connectors 90 and the seismic source 94 being attached by chains 96 to the module 82. A cable stopper 92 is shown provided on a cable 93, between cable supports 104a and 104b. Cable stoppers 92 may be provided for each module 82 to further define a shape of the support assembly. In one application, no cable stopper 92 is provided as discussed later. By determining the appropriate length of the cable stoppers 92, as discussed later, a circle shape may be obtained for the operational position of the support assembly. Electrical and/or air and/or data or other connectors 190, as shown in FIGS. 15a and 15b, are connected to the seismic sources 94 and then, via a connection box 192, to the vessel. While FIG. 15a shows the connectors 190 entering module 82, FIG. 15b illustrates an embodiment in which the connectors 190 and/or the connection box 192 are outside the module 82 and the module 82 is shaped as a plate for improving the water flow.

Figure 16:
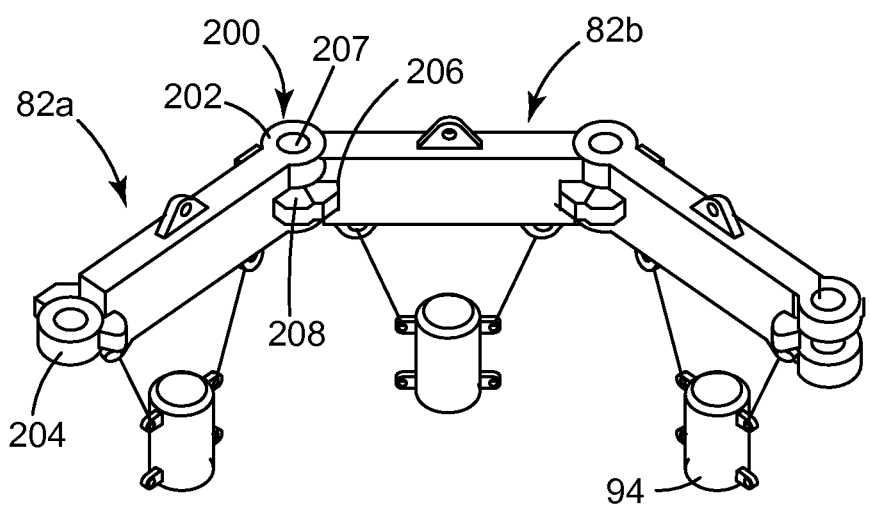
FIG. 16 is a schematic diagram of a joint between two modules according to an exemplary embodiment.

According to an exemplary embodiment illustrated in FIG. 16, a joint 200 between two adjacent modules 82a and 82b may include a male joint 202 and a female joint 204. If this joint is used, then the cable stoppers 92 may not be needed. Two stoppers 206 and 208 may be provided, one on each module at the same joint. The two stoppers 206 and 208 are configured to allow the modules 82a and 82b to rotate one to the other but not to translate one to the other. The joints 202 and 204 may be connected to each other, e.g., via a bolt 207. Thus, the stoppers 206 and 208 limit the rotation range of one module relative to the other module by a desired angle. By calculating the angle, a desired shape of the entire support assembly may be determined, e.g., a circle. In one application, various modules may have various angles.

Figure 17:
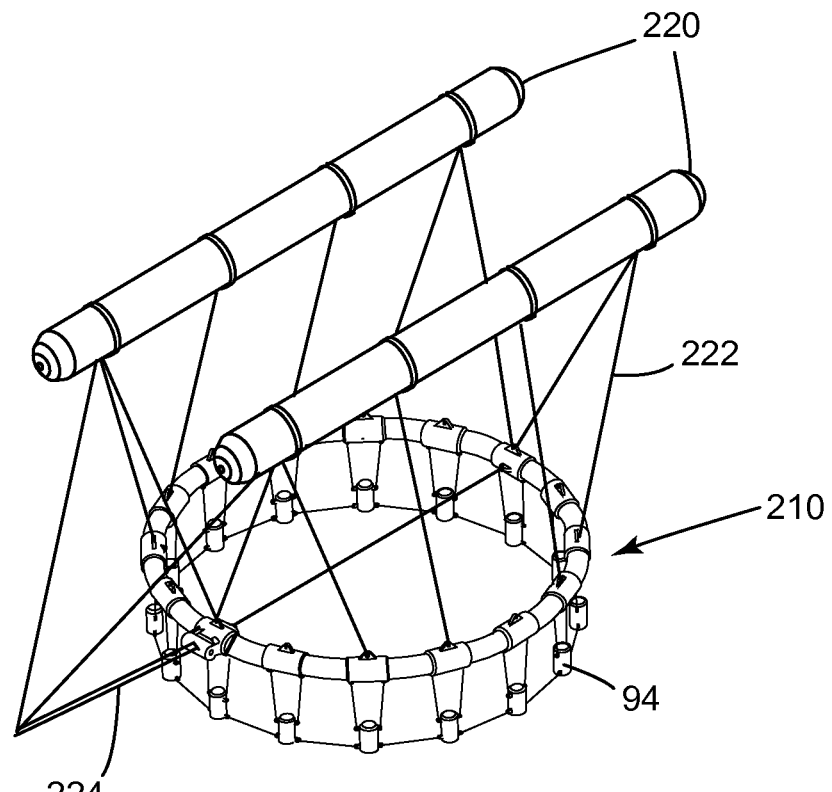
FIGS. 17 and 18 are schematic diagrams of a support assembly and a flotation system according to an exemplary embodiment.
Figure 18:
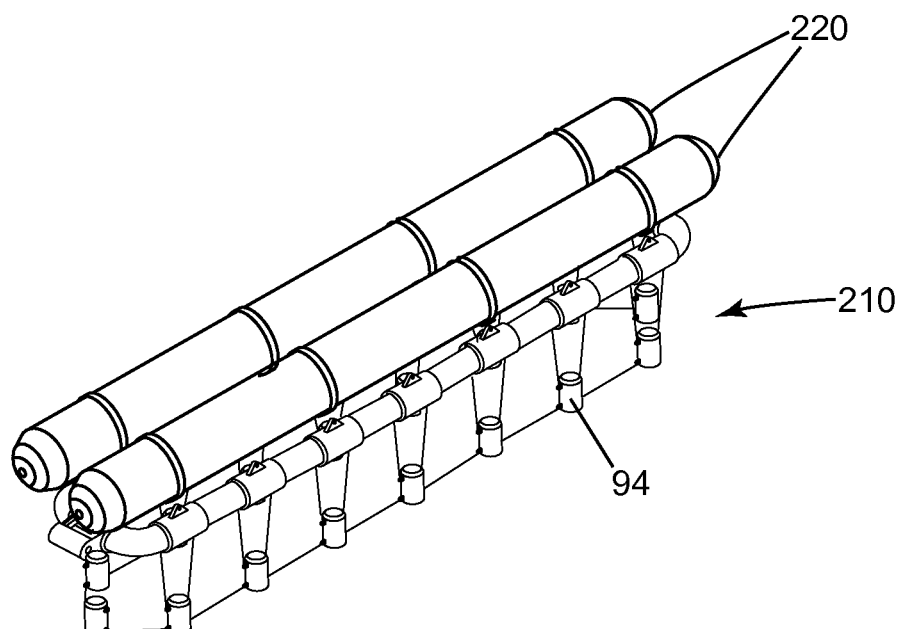

For supporting the weight of a support assembly 210 and the weight of the seismic sources 94 at a given depth under the water, different flotation systems may be used. Such a flotation system 220 is shown in FIGS. 17 and 18 and cables 222 or other means are used to connect the flotation system 220 to the support assembly 210. FIG. 17 shows the support assembly 210 and the flotation system 220 unfolded while FIG. 18 shows the support assembly and the flotation system in a folded position. FIG. 17 also shows a cable 224 that connects the support assembly 210 to the vessel. Cable 224 may include electrical and/or air and/or data connections between the seismic sources and the vessel, cables for towing the support assembly, and/or cables for controlling the actuator or actuators of the support assembly. In one application, no flotation system is necessary as the support assembly 210 may be designed to be buoyant neutral, i.e., float by itself (e.g., have a wing system to control its depth). In an alternative embodiment, the support assembly 210 may be provided with underwater floats.

Figure 19:
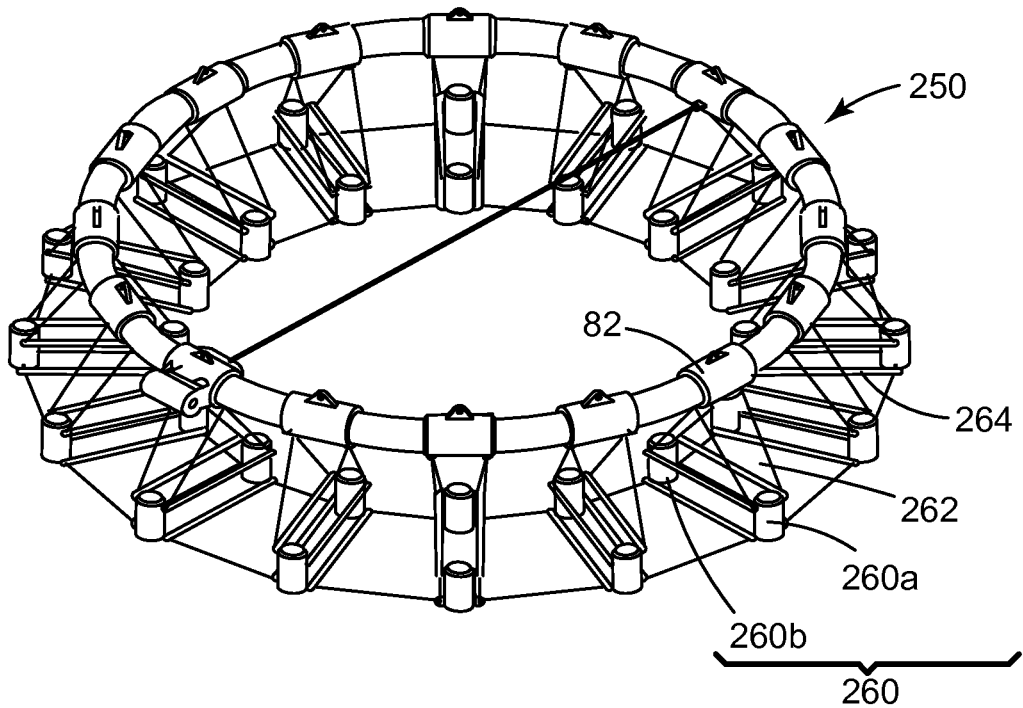
FIG. 19 is a schematic diagram of a support assembly having multiple seismic sources per module (dual clusters) according to an exemplary embodiment.

A few variations of the support assemblies discussed above are now described with regard to FIGS. 19-21. It is noted that other similar variations are possible and the claims are intended to cover those variations. According to an exemplary embodiment illustrated in FIG. 19, the support assembly 250 may be provided with dual seismic sources per module 82. FIG. 19 shows such dual seismic source 260 that includes a first source 260a and a second source 260b. The two sources may be connected to various modules 82 by connecting means 262, e.g., cables, chains, etc. In addition, a distance between the two sources 260a and 260b may be secured by connecting rods 264. The two sources 260a and 260b of a single module 82 may be different.

Figure 20:
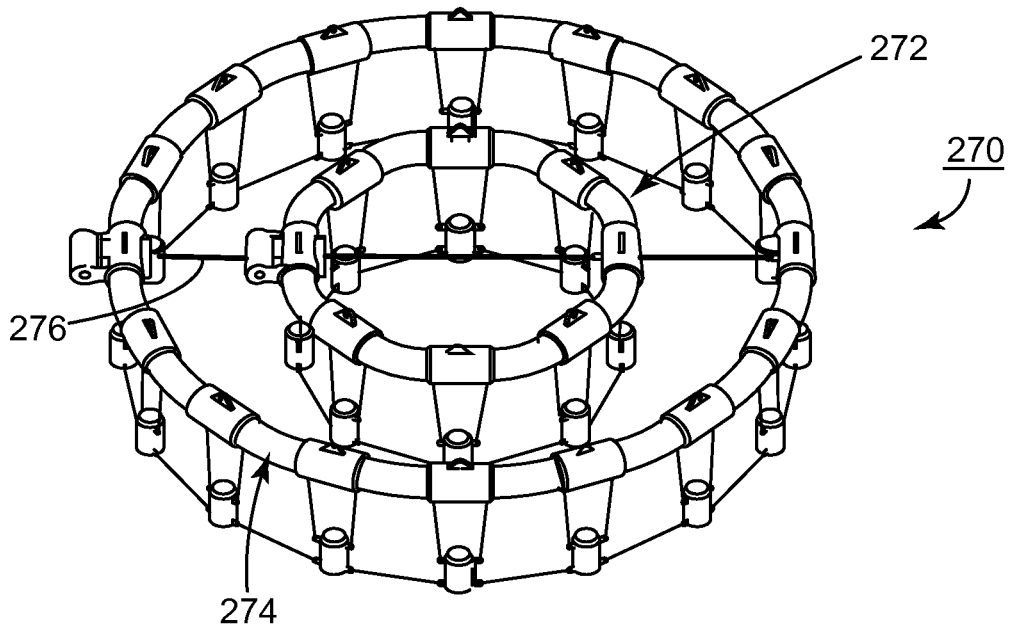
FIG. 20 is a schematic diagram of two concentric support assemblies having their seismic sources at the same depth (or level) according to exemplary embodiments.

Another configuration is illustrated in FIG. 20 in which a support assembly 270, includes a first support assembly 272 similar to those shown in FIGS. 6, 8, 10, and 12 and a second, larger, support assembly 274, also similar to those shown in FIGS. 6, 8, 10, and 12. The two support assemblies 272 and 274 have different radius and they are connected to each other by cables 276 or other means, e.g., rigid connectors. In one application, the support assemblies 272 and 274 are not connected to each other. In one exemplary embodiment, the head modules of each support assemblies are connected to each other. The two support assemblies 272 and 274 are configured to be distributed at the same depth relative to a surface of the water. More support assemblies may be added to the structure shown in FIG. 20.

Figure 21:
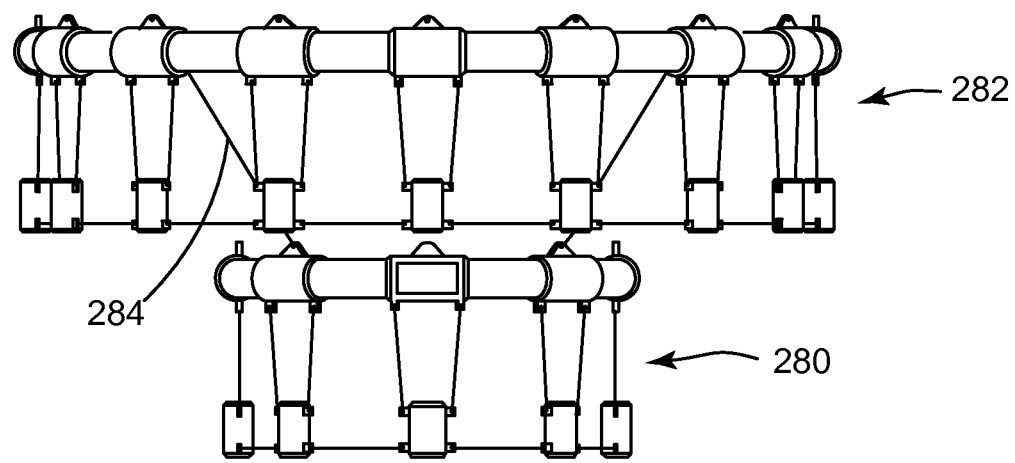
FIG. 21 is a schematic diagram of two concentric support assemblies having their seismic sources at different depths (or level)

Still another configuration is illustrated in FIG. 21. This arrangement is similar to that shown in FIG. 20 but the two support assemblies 280 and 282 are distributed at different depths from the surface of the water, the assembly 280 being above or below the assembly 282. Connectors 284 may be used to connect the head module of the first support assembly 280 to the head module of the second support assembly 282.

According to an exemplary embodiment illustrated in FIG. 22, there is a method for deploying a support assembly from a towing vessel into water or for retracting the support assembly from water into the towing vessel. The method includes a step 2200 of deploying the support assembly into the water in a stowing position; a step 2202 of instructing a rotatable component attached to a head module to tension a cable connected to plural modules and a tail module of the support assembly; and a step 2204 of bringing the support assembly into an operational position in which the plural modules are substantially distributed on a circle.

The disclosed exemplary embodiments provide a system and a method for supporting a seismic source assembly underwater. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A water submerged support assembly for supporting a seismic source assembly, the support assembly comprising:
   a head module;
   an actuator attached to the head module;
   a tail module;
   plural modules provided between the head module and the tail module, the plural modules having means for supporting a cable, wherein part of the plural modules are connected to each other to form a first branch and the remainder of the plural modules are connected to each other to form a second branch, each branch being connected between the head module and the tail module; and a cable system provided through the means for supporting of the plural modules and connected to the actuator for being wind up and unwind to change a distribution of the modules from an operational position to a stowed position, wherein the operational position is defined by the modules being distributed substantially in a round shape, and the stowed position is defined by the first branch and the second branch being substantially parallel to each other.

2. The support assembly of claim 1, further comprising: connectors provided between the plural modules, the connectors being configured to be deformed when a tension is present in the cable system.

3. The support assembly of claim 1, wherein the actuator is a winch.

4. The support assembly of claim 1, wherein the cable system includes a single cable having a first end fixedly connected to the tail module and a second end to a rotating part of the actuator.

5. The support assembly of claim 1, wherein the cable system further comprises:
a single cable having a first end fixedly connected to the head module and a second end connected to a rotating part of the actuator.

6. The support assembly of claim 5, further comprising:
first and second pulleys attached to the tail module;
first and second pulleys attached to the head module so that the single cable passes the second pulley of the tail module, the second pulley of the head module, the first pulley of the tail module and the first pulley of the head module in this order.

7. The support assembly of claim 1, wherein the cable system comprises:
a first cable connected with one end to a rotating part of the actuator and with a second end to a cable divider; and
second and third cables attached between the cable divider and the head module.

8. The support assembly of claim 1, wherein the actuator includes first and second actuators and the cable system comprises:
a first cable having a first end fixedly attached to the head module and a second end attached to a rotating part of the first actuator; and
a second cable having a first end fixedly attached to the head module and a second end attached to a rotating part of the second actuator so that the first cable is configured to pass through the means for supporting of the first branch, and the second cable is configured to pass through the means for supporting of the second branch.

9. The support assembly of claim 1, further comprising: fairings provided on the plural modules.

10. The support assembly of claim 1, further comprising: plural sources connected to each module of the plural modules.

11. The support assembly of claim 1, further comprising: another support assembly configured to be provided inside the support assembly at a same level underwater.

12. The support assembly of claim 1, further comprising: another support assembly configured to have a smaller radius then the support assembly and to be provided at a different depth underwater.

13. The support assembly of claim 1, further comprising: joints provided between adjacent modules, the joints being configured to allow the modules to rotate one to the other but not to translate one to the other.

14. The support assembly of claim 1, further comprising: cable stoppers provided along cables of the cable system between adjacent means for supporting a cable for preventing a full rotation of one module relative to another module.

15. A water submerged support assembly for supporting a seismic source assembly, the support assembly comprising:
a head module;
an actuator attached to the head module;
a tail module;
plural modules provided between the head module and the tail module to form a first branch and a second branch, each branch being connected between the head module and the tail module; and
a cable system provided through means for supporting of the plural modules and connected to the actuator for being wind up and unwind to change a distribution of the modules from an operational position to a stowed position.

16. The support assembly of claim 15, wherein the operational position is defined by the modules being distributed substantially in a circular shape; and the stowed position is defined by the first branch and the second branch being substantially parallel to each other.

17. The support assembly of claim 15, wherein the cable system includes a single cable having a first end fixedly connected to the tail module and a second end to a rotating part of the actuator.

18. The support assembly of claim 15, wherein the cable system further comprises:
a single cable having a first end fixedly connected to the head module and a second end connected to a rotating part of the actuator;
first and second pulleys attached to the tail module; and
first and second pulleys attached to the head module so that the single cable passes the second pulley of the tail module, the second pulley of the head module, the first pulley of the tail module and the first pulley of the head module in this order.

19. The support assembly of claim 15, wherein the cable system comprises:
a first cable connected with one end to a rotating part of the actuator and with a second end to a cable divider; and
second and third cables attached between the cable divider and the head module.

20. A method for deploying a support assembly from a towing vessel into water or for retracting the support assembly from water into the towing vessel, the method comprising:
deploying the support assembly into the water in a stowing position;
instructing an actuator attached to a head module to tension a cable connected to plural modules and a tail module of the support assembly; and
bringing the support assembly into an operational position in which the plural modules are substantially distributed on a circle, wherein the plural modules have means for supporting the cable, part of the plural modules are connected to each other to form a first branch and the remainder of the plural modules are connected to each other to form a second branch, each branch being connected to the head module and the tail module.

* * * * *